United States Patent
Huang et al.

(10) Patent No.: US 7,775,816 B1
(45) Date of Patent: Aug. 17, 2010

(54) ELECTRONIC DEVICE CASE STRUCTURE HAVING FUNCTION OF EJECTING PERIPHERAL DEVICE

(75) Inventors: Yu-Hsin Huang, Taipei Hsien (TW); Yu-Chen Lee, Taipei Hsien (TW); Chun-Yi Chou, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 0 days.

(21) Appl. No.: 12/542,362

(22) Filed: Aug. 17, 2009

(30) Foreign Application Priority Data

Jun. 10, 2009 (TW) .............................. 98210308 U (51) Int. Cl.
*H01R 13/62* (2006.01)
(52) U.S. Cl. ...................................................... 439/159
(58) Field of Classification Search ................. 439/159, 439/157, 160
See application file for complete search history.

(56) References Cited

U.S. PATENT DOCUMENTS

| | | | | |
|---|---|---|---|---|
| 6,027,350 | A * | 2/2000 | Chen et al. ................... | 439/159 |
| 6,145,747 | A * | 11/2000 | Wu ............................. | 235/486 |
| 6,290,136 | B1 * | 9/2001 | Koseki et al. ................ | 235/475 |
| 6,379,167 | B1 * | 4/2002 | Zhang et al. ................. | 439/157 |
| 6,814,597 | B1 * | 11/2004 | Kao ............................ | 439/159 |
| 7,542,282 | B2 * | 6/2009 | Chen et al. .............. | 361/679.01 |

FOREIGN PATENT DOCUMENTS

| TW | 437979 | 5/2001 |
|---|---|---|
| TW | M335714 | 7/2008 |

* cited by examiner

*Primary Examiner*—Chandrika Prasad
(74) *Attorney, Agent, or Firm*—Muncy, Geissler, Olds, & Lowe, PLLC (57) ABSTRACT

An electronic device case structure includes a case body, a pivoting seat, a pushing member, and a driving member. An accommodating slot is formed on the case body for a peripheral device to be inserted therein. The case body has a disposition hole communicating with the accommodating slot and an internal space of the case body. The pivoting seat is disposed in the case body, and the pushing member is pivoted to the pivoting seat. The pushing member has a pushing segment, protruding in the accommodating slot through the disposition hole and a connecting segment. The driving member includes a coupling end connected to the connecting segment and an operation end, The operation end is to be pressed to make the driving member move inwards, so as to have the pushing segment to move towards the outside of the accommodating slot, thereby pushing and ejecting the peripheral device.

12 Claims, 9 Drawing Sheets

ELECTRONIC DEVICE CASE STRUCTURE HAVING FUNCTION OF EJECTING PERIPHERAL DEVICE

CROSS-REFERENCES TO RELATED APPLICATIONS

This non-provisional application claims priority under 35 U.S.C. §119(a) on Patent Application No. 98210308 filed in Taiwan, R.O.C. on 2009/6/10, the entire contents of which are hereby incorporated by reference.

BACKGROUND OF THE INVENTION

1. Technical Field

The present invention relates to installing a removable peripheral device to a electronic device and removing the removable peripheral device from the electronic device, and more particularly to an electronic device case structure having an ejecting mechanism.

2. Related Art

Functions of an electronic device can be changed or expanded by installing and removing a removable peripheral device. For example, for a multimedia electronic device, a storage capacity is expanded and the storage content is directly replaced through replacing a removable hard disk. For ease of removal, the hard disk is usually installed in a tray, and a case of a multimedia computer device is equipped with an accommodating slot, such that the tray is inserted in the accommodating slot, and the hard disk is electrically coupled to the multimedia electronic device.

A process of inserting the tray in the accommodating slot is relatively simple, involving a force applied to push the tray in the accommodating slot, such that the tray is combined with the case body, and the hard disk is electrically coupled to the multimedia electronic device. In order to combine the tray and the case body of the electronic device as a whole, and have a compact appearance, the tray is usually just accommodated in the accommodating slot without any part protruding outward. However, the absence of such an outward protruding part makes it relatively difficult to remove the tray.

In order to remove the tray, Taiwan Patent No. 437979 discloses a "Removable Power Supply or Disk Driver Positioning and Separating Device", a supporting board is provided to support a power supply or disk driver, and a positioning device is used to fix the supporting board on a case body. A handle recess is disposed on an external part of the supporting board, for a user to grasp. When intending to take out the power supply or the disk driver supported by the supporting board, the user may grasp the handle recess, so as to pull out the supporting board. However, the handle recess is a structure protruding from the case body, and the appearance of the handle recess cannot be combined with the case body as a whole, thereby affecting an aesthetic of the case body. In Taiwan Utility Model No. M335714, entitled "Automatic Assembling/Disassembling Device for Movable Hard Disk Tray", the hard disk tray is fixed or automatically ejects through pressing the hard disk tray. However, a structure of the automatic assembling/disassembling device is much more complicated, so it is difficult to assemble or a cost is too high.

Therefore, how to solve the problem of extracting the removable peripheral device without affecting the appearance of the case body remains a technical problem.

SUMMARY

The removable peripheral device in the art is hard to be removed from an electrical device or the electrical device equipped with the removable peripheral device has an undesirable appearance.

The present invention provides an electronic device case structure having function of ejecting a peripheral device inserted therein, which is applicable to an electronic device equipped with the peripheral device. The electronic device case structure includes a case body, a pivoting seat, a pushing member, and a driving member. An accommodating slot is formed on a surface of the case body for the peripheral device to be inserted therein The case body has at least one disposition hole for communicating with the accommodating slot and an internal space of the case body. The pivoting seat is disposed in the case body, and the pushing member is pivoted to the pivoting seat, and rotates according to a horizontal transverse axis. The pushing member has a pushing segment and a connecting segment. The pushing segment protrudes in the accommodating slot through the disposition hole. The driving member is disposed in the case body along a horizontal longitudinal axis. The driving member includes an operation end and a coupling end. The coupling end is connected to the connecting segment. The operation end protrudes from the case body, and is pressed to make the driving member move inwards along the horizontal longitudinal axis, so as to push the pushing segment of the pushing member to swing. Therefore, a free end of the pushing segment moves in a reverse direction to the driving member. That is, the free end moves towards the outside of the accommodating slot to push and eject the peripheral device from the accommodating slot.

By pressing the operation end of the driving member, the peripheral device is easily to be ejected from the accommodating slot. An additional structure on the peripheral device for being grasped by a user is not required, such that the appearance of peripheral device matches with the appearance design of the electronic device case structure, thereby achieving an effect of beautifying the appearance.

BRIEF DESCRIPTION OF THE DRAWINGS

The present invention will become more fully understood from the detailed description given herein below for illustration only, and thus not limitative of the present invention, wherein.

DETAILED DESCRIPTION

Referring to FIGS. 1, 2, 3, and 4, an electronic device case structure 100 having function of ejecting a peripheral device 200 inserted therein according to an embodiment of the present invention is shown. The electronic device case structure 100 is applicable to an electronic device equipped with the peripheral device 200, and the peripheral device 200 can be easily ejected from the electronic device case structure 100.

Figure 1:
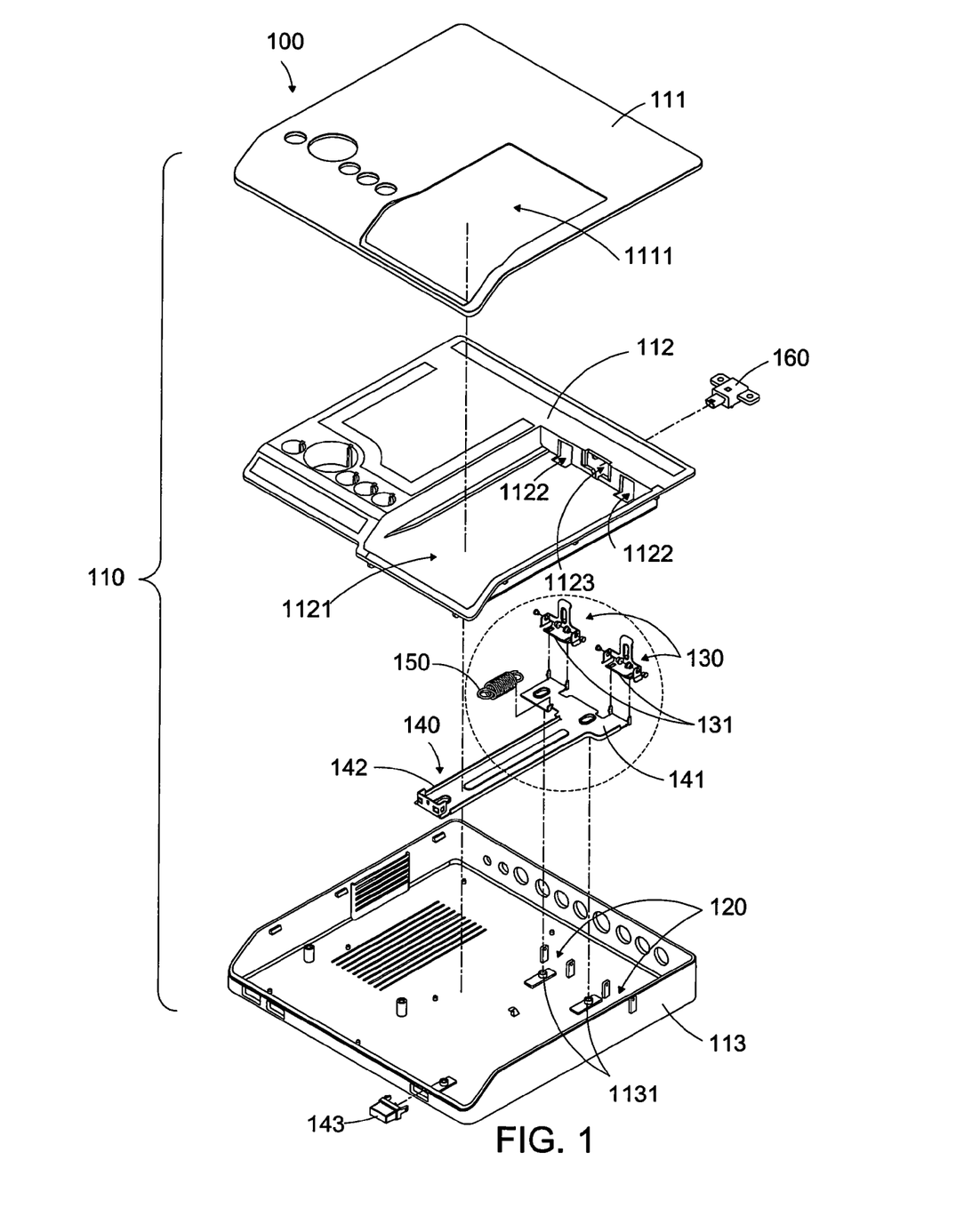
FIG. 1 is an exploded view according to an embodiment of the present invention.
Figure 2:
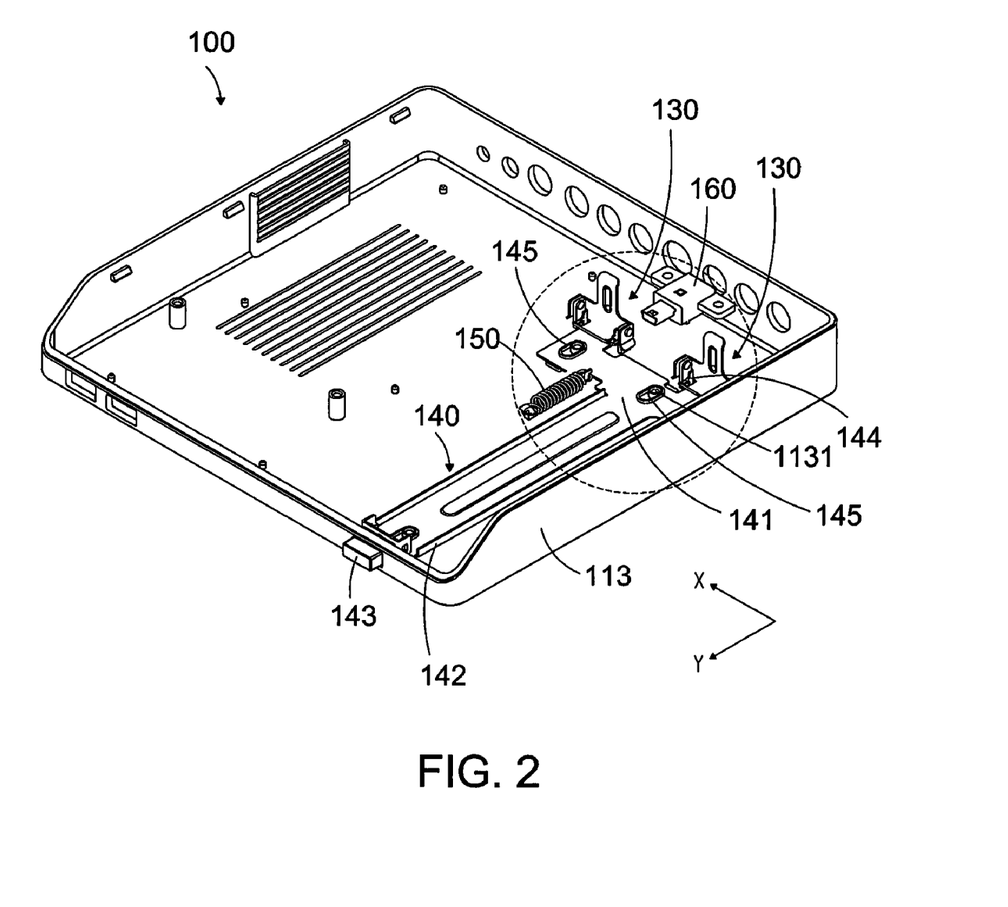
FIG. 2 is a perspective view according to an embodiment of the present invention in which the peripheral device is separated from the case body.

Referring to FIGS. 1 and 2, the electronic device case structure 100 includes a case body 110, one or more pivoting seats 120, one or more pushing members 130, a driving member 140, and an elastic member 150.

Figure 3:
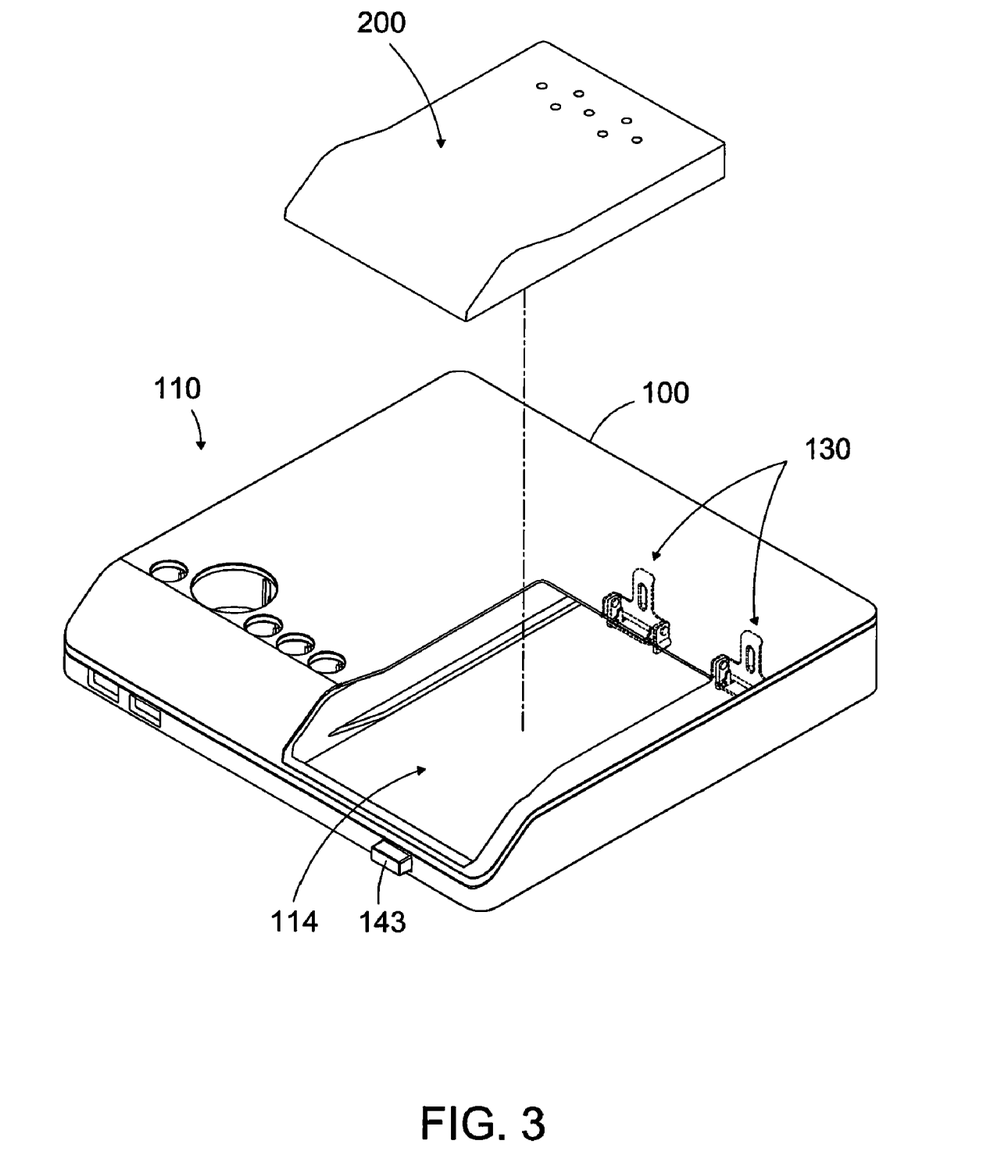
FIG. 3 is a perspective view of a part of components according to the embodiment of the present invention.
Figure 4:
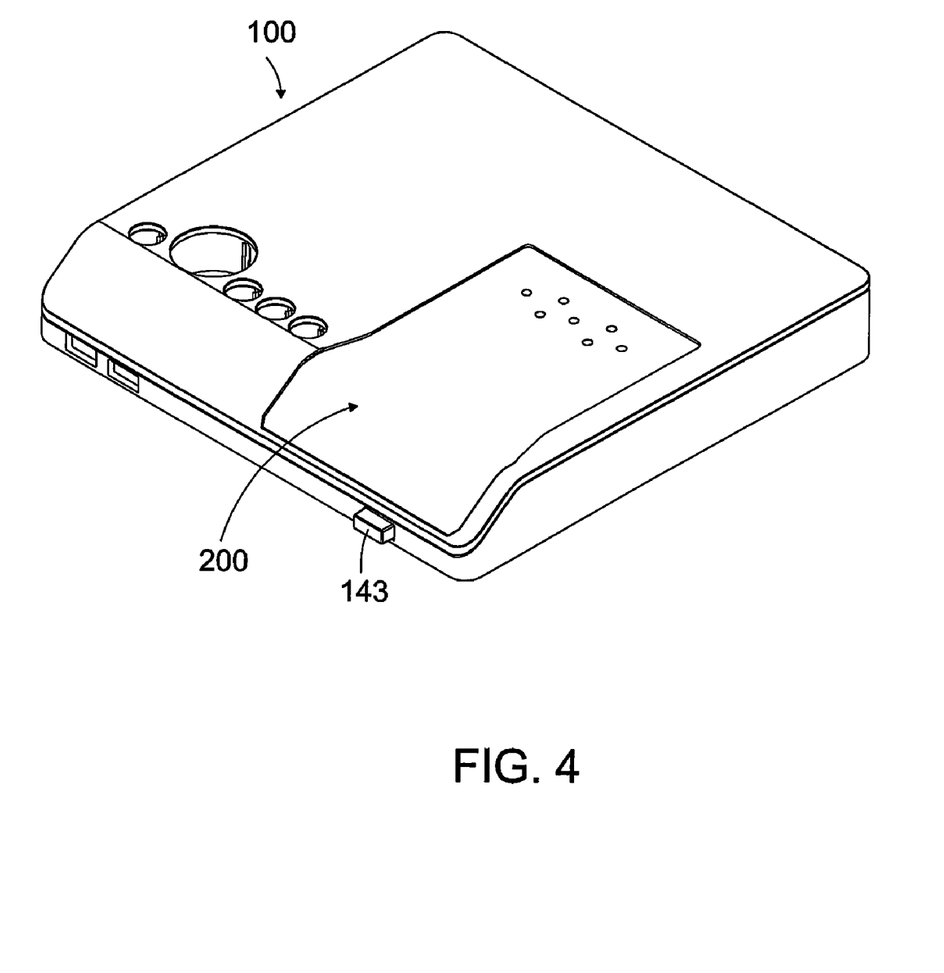
FIG. 4 is a perspective view of an embodiment of the present invention in which the peripheral device is inserted into the case structure.

Referring to FIGS. 1 and 3, the case body 110 includes an upper cover 111, a middle cover 112, and a lower cover 113. The middle cover 112 is combined with the lower cover 113, such that an accommodating space is defined inside the case body 110. The upper cover 111 is further combined with the middle cover 112, so as to cover uneven structure on the middle cover 112, such that the case body 110 has a smooth appearance. The middle cover has a recess 1121, and the upper cover 111 has an elongated slot hole 1111. When the upper cover 111 is combined with the middle cover 112, the elongated slot hole 1111 is coincided with the recess 1121. A length of the elongated slot hole 1111 is smaller than a length of the recess 112, such that at least a part of the recess 1121 is shielded by the upper cover 111 to form an accommodating slot 114 on a surface of the case body 110. The accommodating slot 114 is provided for the peripheral device 200 (for example, an external hard disk case) to be inserted therein, such that the peripheral device 200 is combined with the case structure 100.

Referring to FIGS. 1 and 3, the middle cover 112 further has one or more disposition holes 1122. When the middle cover 112 is combined with the lower cover 113, the disposition holes 1122 communicate with the recess 1121 and the accommodating space inside the case body 110. When the upper cover 111 is further combined with the middle to form the accommodating slot 114, the disposition holes 1122 communicate with the accommodating slot 114 and the accommodating space inside the case body 110.

Referring to FIGS. 1 and 2, at least one circuit board (not shown in the drawings) and an electrical connector 160 are further disposed in the case body 110, an electronic circuit is disposed on the circuit board, so as to provide functions required by an operation of the electronic device. The electrical connector 160 is disposed on the case body 110 and is electrically coupled to the circuit board, and runs through the middle cover 112 via an opening 1123, so as to be located in the recess 1121, that is, located in the accommodating slot 114. When the peripheral device 200 is inserted into the case body 110, the electrical connector 160 is inserted into an electrical port of the peripheral device 200 (not shown), such that the peripheral device 200 is electrically coupled to the electronic circuit, for performing data exchange.

Referring to FIGS. 1, 2, and 3, the pivoting seat 120 and the pushing member 130 are disposed in the case body 110 in a pair, in which the pivoting seat 120 is fixed on the lower cover 113, and the pushing member 130 is pivoted to the pivoting seat 120.

Figure 5:
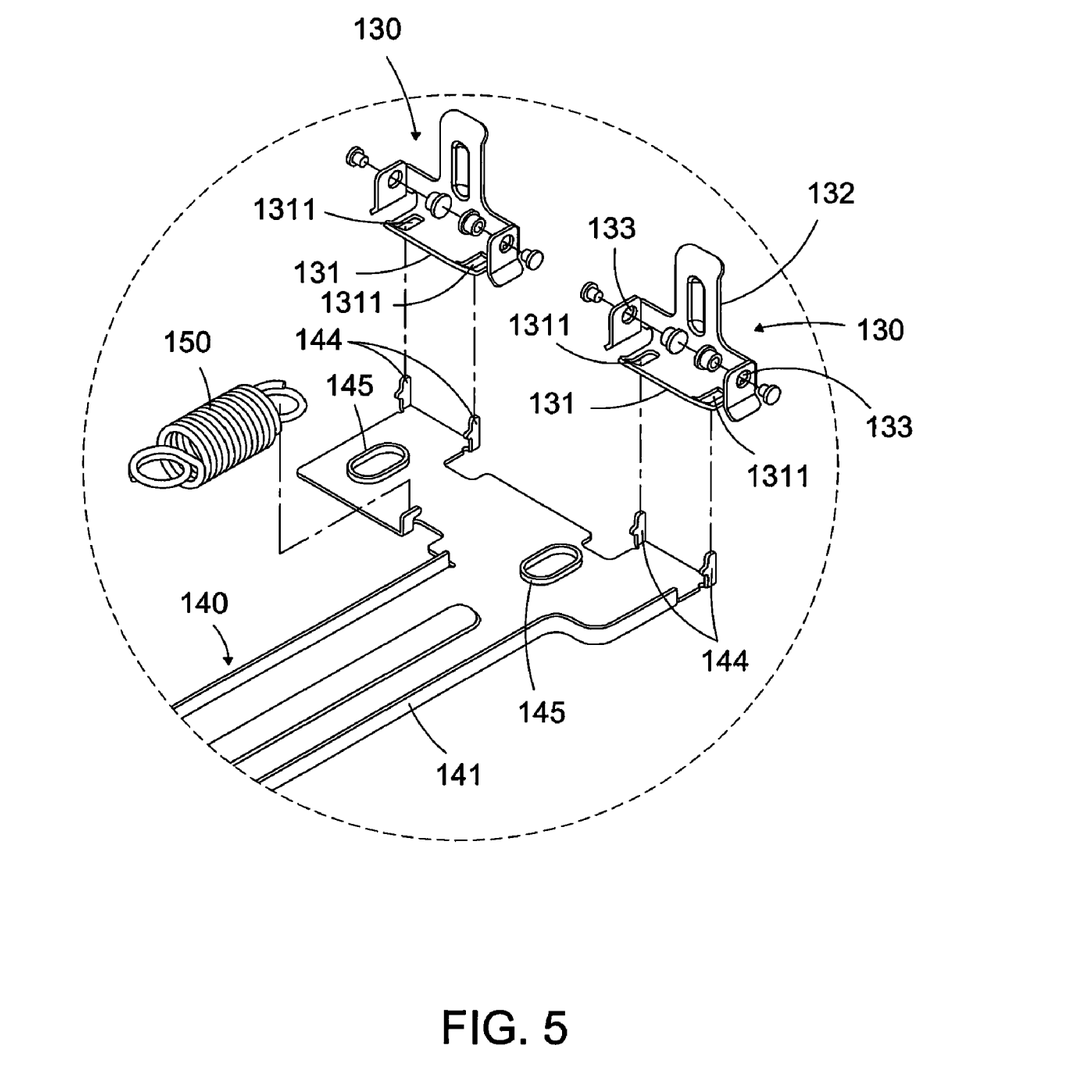
FIG. 5 is a partially enlarged view of FIG. 1.
Figure 6:
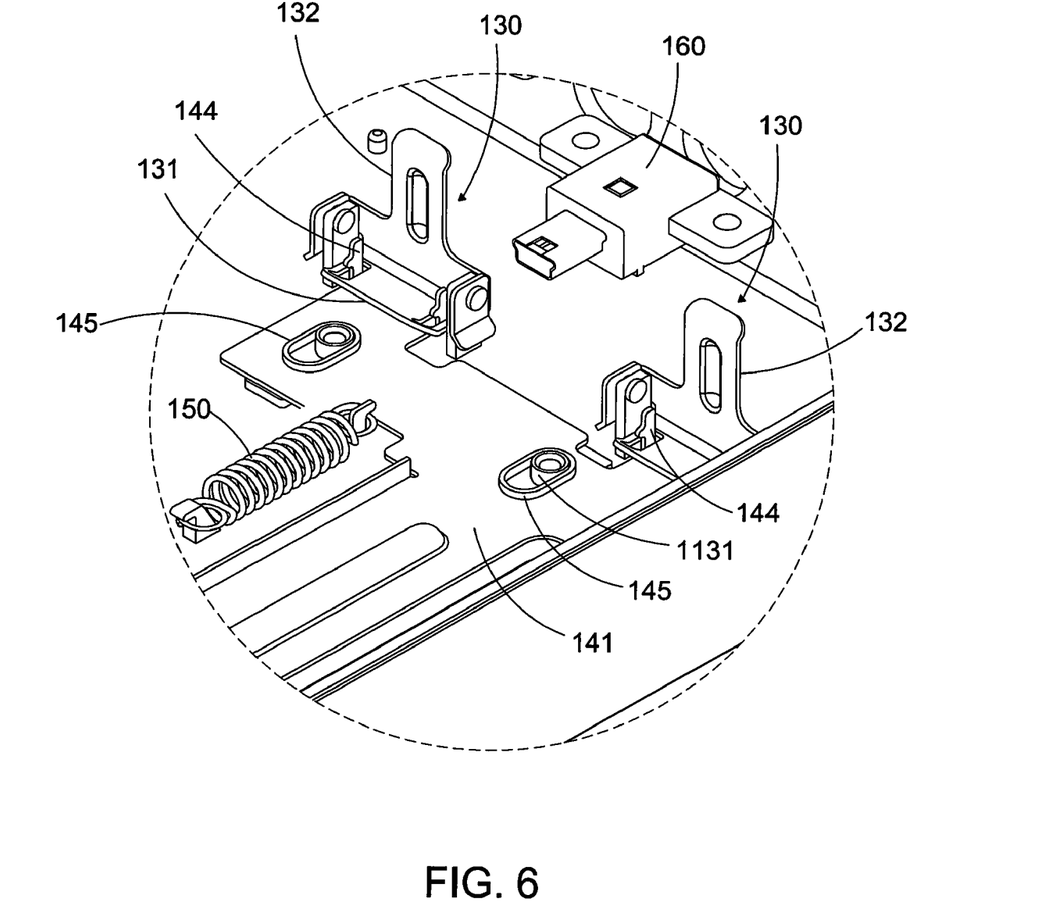
FIG. 6 is a partially enlarged view of FIG. 4.

Referring to FIGS. 5 and 6, in which the pushing member 130 includes a connecting segment 131 and a pushing segment 132, and an included angle of approximately 90 degrees is formed between the connecting segment 131 and the pushing segment 132. At least one slit 1311 is formed on the connecting segment 131. The pushing segment 132 protrudes in the recess 1121 through the disposition hole, such that a part of the pushing segment 132 is located in the accommodating slot 114. The pushing member 130 further includes two lugs 133, and two bolts respectively run through the two lugs 133 and are inserted into the pivoting seat 120, such that the pushing member 130 is pivoted to the pivoting seat 120, so that the pivoting seat 120 rotates according to a horizontal transverse axis X.

Referring to FIGS. 1 and 2, the driving member 140 is disposed in the case body 110 along a horizontal longitudinal axis Y, and the driving member 140 includes a coupling end 141 and an operation end 142. The operation end 142 runs through the middle cover 112 via an aperture and protrudes from the case body 110, and a key cap 143 is disposed on the operation end 142. At least one hook 144 is disposed on the coupling end 141, inserted into the slit 1311 of the connecting segment 131 of the pushing member 130, and is connected to the connecting segment 131, thereby connecting the driving member 140 and the pushing member 130. After the driving member 140 moves for a limited travel distance to make the hook 144 contact with an end of the slit 1311, the hook 144 further pushes the pushing member 130 so that it swings. The hook 144 performs moved in limited travel range in the slit 1311, such that the driving member 140 performs back-and-forth movement in a straight line. The coupling end 141 does not always swing when the pushing member 130 swings, such that the driving member 140 moves near a bottom of the lower cover 113 as much as possible, and it is not necessary to reserve a space for the driving member 140 to swing in the case body 110.

The driving member 140 is pushed to move along the horizontal longitudinal axis Y, so as to push the pushing member 130. After being pushed, the pushing member 130 swings according to the horizontal transverse axis X. When the driving member 140 is pushed to move inwards along the horizontal longitudinal axis Y, the pushing member 130 swings and the connecting segment 131 of the pushing member 130 also moved inward. Since the pushing member 130 is pivoted to the lower cover 113 through the pivoting seat 120, a free end of the pushing segment 132 moves in a reverse direction to the driving member 140 and the connecting segment 131. That is, the free end of the pushing segment 132 moves towards the outside of the accommodating slot 114.

When the driving member 140 moves outwards along the horizontal longitudinal axis Y, the pushing member 130 swings and the connecting segment 131 of the pushing member 130 also moves towards the same direction to the driving member 140, such that the pushing segment 132 moves in a reverse direction to the driving member 140 and the connecting segment 131, that is, the free end of the pushing segment 132 moves towards the inside of the accommodating slot 114, so as to return to an upright state.

In addition, the driving member 140 has one or more limiting slots 145, a corresponding limiting member 1131 is disposed on the lower cover 1131, and the limiting member 1131 is inserted into the limiting slot 145, so as to limit the travel range of the driving member 140.

The elastic member 150 provides an elastic force to continuously push the driving member 140 to move outwards. In the embodiment of the present invention, the elastic member 150 is an extension spring having one end connected to the lower cover 113 and the other end connected to the driving member 140. The elastic member 140 is normally extended, so as to generate a tension to push the driving member 140 to move outwards. At this time, the connecting segment 131 is pulled by the driving member 140 and becomes approximately parallel to the horizontal longitudinal axis Y. Since the included angle between the connecting segment 131 and the pushing segment 132 is approximately 90 degrees, the pushing segment 132 stays the upright state.

Figure 7A:
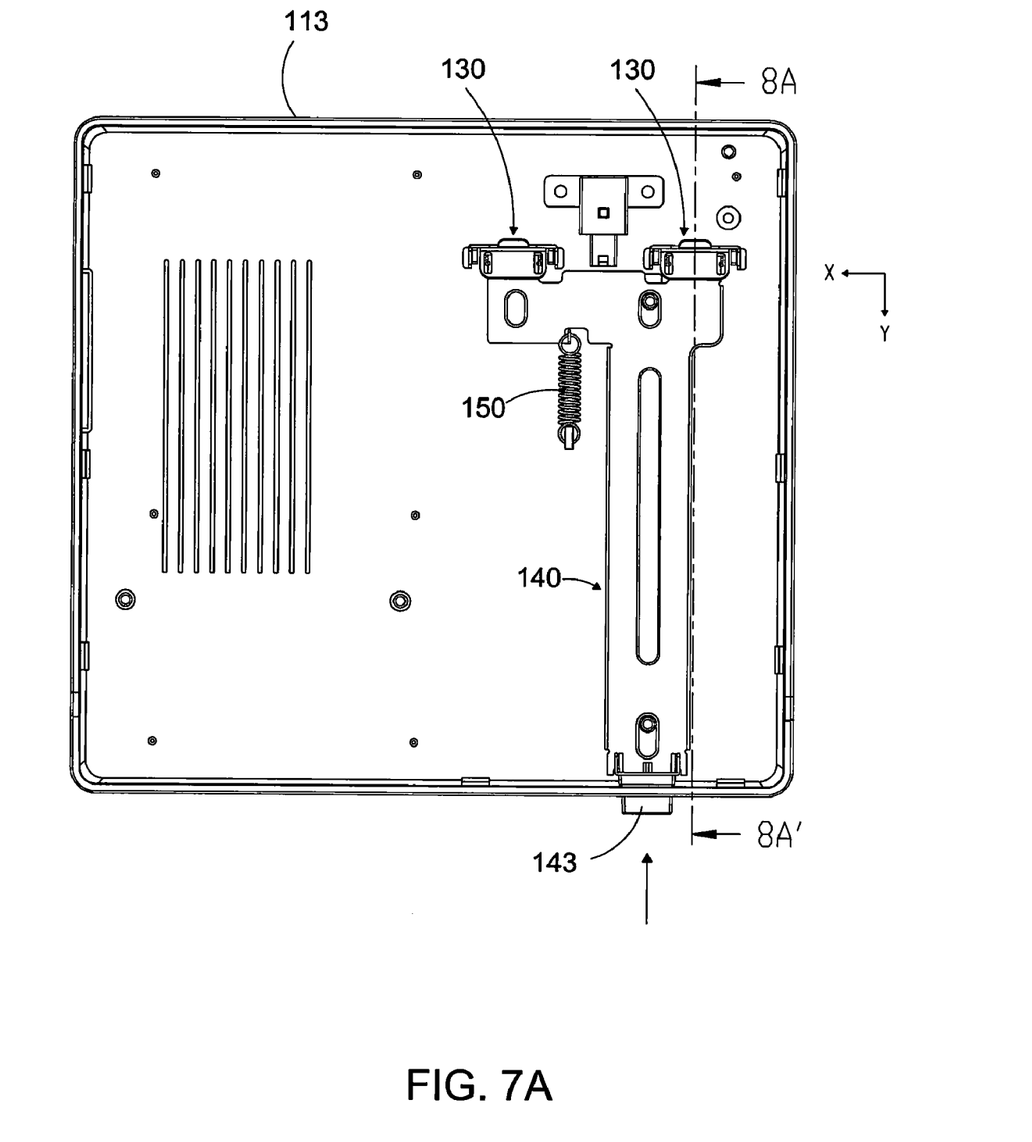
FIGS. 7A and 7B are top views of a part of elements according to the embodiment of the present invention.
Figure 8A:
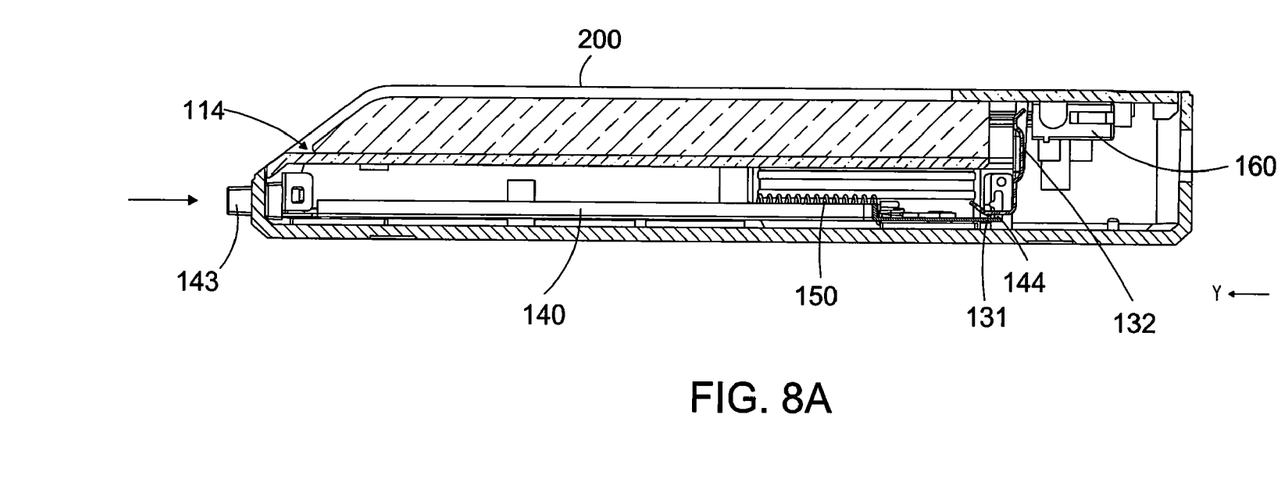
FIG. 8A is a schematic cross-sectional view along an 8A-8A' line in FIG. 7A.

Referring to FIGS. 7A and 8A, the elastic member 150 continuously applies an outward elastic force to the driving member 140, such that the pushing segment 132 of the pushing member 130 is kept in the upright state, so as to prevent from interfering with the action of inserting the peripheral device 200 to the accommodating slot 114. Here, the peripheral device 200 is inserted into the accommodating slot 114, and is connected to the electrical connector 160. Practically, the elastic member 150 may be omitted, and when the peripheral device 200 is inserted into the accommodating slot 114, the pushing segment 132 of the pushing member 130 is pushed, so as to resume to the upright state, and to push the driving member to move outwards.

Figure 7B:
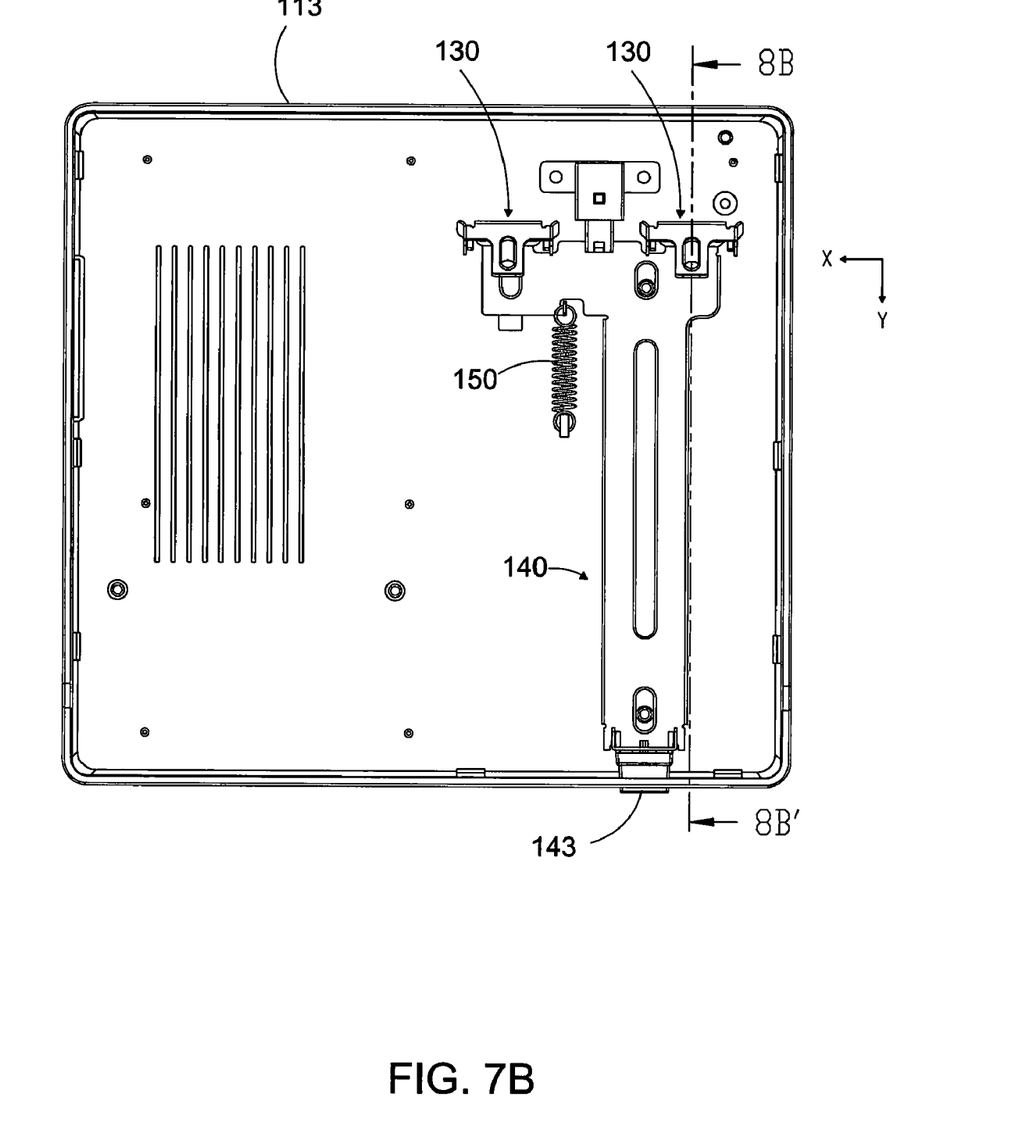
Figure 8B:
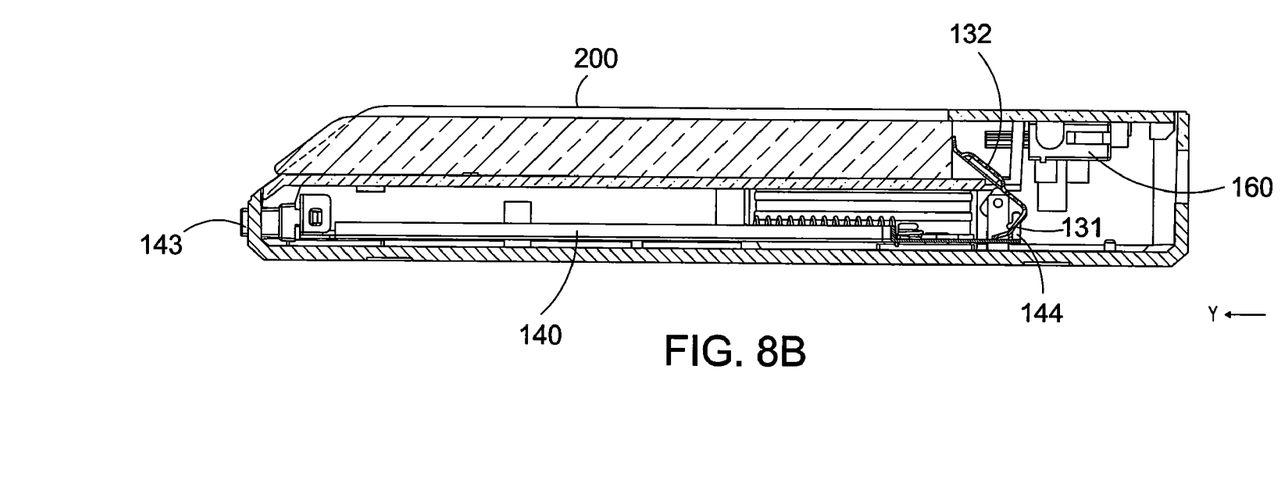
FIG. 8B is a schematic cross-sectional view along the 8B-8B' line in FIG. 7B.

Referring to FIGS. 7B and 8B, at least a part of the key cap 143 protrudes from the case body 110 to be pressed by a user. When the key cap 143 is pressed, the driving member 140 is pushed to move inwards along the horizontal longitudinal axis Y. The pushing member 130 swings and the connecting segment 131 of the pushing member 130 moves towards the same direction to the driving member 140. And the pushing segment 132 moves towards the outside of the accommodating slot 114, thereby pushing the peripheral device 200 outwards.

The pushed peripheral device 200 protrudes from the surface of the case body 110, and in this manner the user may directly grasp the peripheral device 200. Through the electronic device case structure 100 according to the present invention, a non-slip structure, a handle, or other structures affecting the appearance of the peripheral device 200 on the surface of the peripheral device 200 is not required.

Referring to FIGS. 7A and 7B, in which a number of the pushing members 130 depends on a width of the peripheral device 200. When the width of the peripheral device 200 is relatively large, the number of the pushing members 130 is increased, such that the pushing members 130 may uniformly apply the force to the peripheral device 200. When the width of the peripheral device 200 is relatively small, the smaller number of the pushing members 130, or even a single pushing member 130, may uniformly apply the force to the peripheral device 200.

While the present invention has been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. An electronic case structure having function of ejecting a peripheral device inserted therein, applicable to an electronic device equipped with the peripheral device, the electronic device case structure comprising:
    a case body, having an accommodating slot formed on a surface for the peripheral device to be inserted therein, and having at least one disposition hole communicating with the accommodating slot and an internal space of the case body;
    at least one pivoting seat, disposed in the case body;
    at least one pushing member, pivoted to the pivoting seat, rotating about to a horizontal transverse axis, and having a pushing segment protruding in the accommodating slot through the disposition hole; and a connecting segment; and
    a driving member, disposed in the case body along a horizontal longitudinal axis, and having a coupling end connected to the connecting segment and an operation end protruding from the case body, wherein the operation end is to be pressed to make the driving member move inwards along the horizontal longitudinal axis, so as to push the pushing member to swing and to have a free end of the pushing segment to move the peripheral device outside of the accommodating slot.

2. The electronic device case structure as claimed in claim 1, wherein the case body comprises:
    a lower cover, for the pivoting seat to be disposed thereon;
    a middle cover, combined with the lower cover, and having a recess; and
    an upper cover, combined with the middle cover, and having an elongated slot hole coincided with the recess, wherein at least a part of the recess is shielded by the upper cover, so as to form the accommodating slot.

3. The electronic device case structure as claimed in claim 2, wherein the disposition hole is formed on the middle cover.

4. The electronic device case structure as claimed in claim 2, wherein a length of the elongated slot hole is smaller than a length of the recess.

5. The electronic device case structure as claimed in claim 2, wherein the driving member has at least one limiting slot, a corresponding limiting member is disposed on the lower cover, and the limiting member is inserted into the limiting slot to limit a travel range of the driving member.

6. The electronic device case structure as claimed in claim 1, further comprising an electrical connector disposed on the case body and located in the accommodating slot.

7. The electronic device case structure as claimed in claim 1, wherein an comprised angle being approximately 90 degrees is formed between the connecting segment and the pushing segment.

8. The electronic device case structure as claimed in claim 1, wherein at least one slit is formed on the connecting segment of the pushing member, at least one hook is disposed on the coupling end of the driving member, and the hook penetrates the slit of the connecting segment, so as to connect to the driving member and the pushing member.

9. The electronic device case structure as claimed in claim 1, wherein the pushing member further comprises two lugs, and two bolts respectively run through the two lugs and are inserted into the pivoting seat, such that the pushing member is pivoted to the pivoting seat.

10. The electronic device case structure as claimed in claim 1, wherein a key cap is disposed on the operation end of the driving member.

11. The electronic device case structure as claimed in claim 1, further comprising an elastic member, continuously pushing the driving member to move outwards.

12. The electronic device case structure as claimed in claim 11, wherein the elastic member is an extension spring having one end connected to the case body and the other end connected to the driving member.

* * * * *